United States Patent [19]

Komurasaki et al.

[11] Patent Number: 4,969,441
[45] Date of Patent: Nov. 13, 1990

[54] KNOCKING SUPPRESSION APPARATUS FOR AN INTERNAL COMBUSTION ENGINE

[75] Inventors: Satosi Komurasaki; Yasuhiko Hosoya, both of Himeji, Japan

[73] Assignee: Mitsubishi Denki Kabushiki Kaisha, Tokyo, Japan

[21] Appl. No.: 433,828

[22] Filed: Nov. 9, 1989

[30] Foreign Application Priority Data

Nov. 11, 1988 [JP] Japan .................................. 63-283880

[51] Int. Cl.⁵ .............................................. F02P 5/145
[52] U.S. Cl. .......................................... 123/425; 73/35
[58] Field of Search ...................... 123/425, 435; 73/35

[56] References Cited

U.S. PATENT DOCUMENTS

| | | | |
|---|---|---|---|
| 4,002,155 | 1/1977 | Marned et al. | 123/425 |
| 4,450,709 | 5/1984 | Hayashi | 73/35 |
| 4,468,950 | 9/1984 | Ishigami et al. | 73/35 |
| 4,475,508 | 10/1984 | Okada | 123/435 |
| 4,517,945 | 5/1985 | Ishigami et al. | 123/435 |
| 4,598,681 | 7/1986 | Hayashi | 123/425 |
| 4,606,316 | 8/1986 | Komurasaki | 123/425 |
| 4,805,442 | 2/1989 | Okumura et al. | 73/35 |
| 4,903,646 | 2/1990 | Minagawa et al. | 123/425 |

FOREIGN PATENT DOCUMENTS

| | | | |
|---|---|---|---|
| 0033514 | 4/1981 | Japan | 73/35 |
| 0034417 | 2/1982 | Japan | 73/35 |

Primary Examiner—Tony M. Argenbright
Assistant Examiner—Robert E. Mates
Attorney, Agent, or Firm—Sughrue, Mion, Zinn, Macpeak & Seas

[57] ABSTRACT

A knocking suppression apparatus for a multi-cylinder engine has a knock sensor mounted on a bracket which is secured to the engine in at least two locations. Engine vibrations are transmitted from the engine to the knock sensor by the bracket. The knock sensor generates an electrical signal, on the basis of which a knocking suppression circuit controls an engine operating parameter, such as the ignition timing, so as to suppress knocking.

11 Claims, 6 Drawing Sheets

FIG. 7 ic # KNOCKING SUPPRESSION APPARATUS FOR AN INTERNAL COMBUSTION ENGINE

BACKGROUND OF THE INVENTION

This invention relates to a knocking suppression apparatus for an internal combustion engine. More particularly, it relates to a knocking suppression apparatus which can detect knocking using only a single knock sensor.

A knocking suppression apparatus is a device which can stop or prevent knocking in an internal combustion engine. Knocking can be suppressed by adjusting the manifold pressure or the fuel supply, or most commonly, by adjusting the ignition timing of an engine. A typical knocking suppression apparatus includes a knock sensor in the form of an acceleration sensor. The knock sensor detects engine accelerations due to knocking and generates a corresponding electrical output signal. A signal processing circuit identifies signals due to knocking in the output signal of the knock sensor. When knocking is detected, the ignition coil of the engine is controlled so as to delay the ignition timing to the point where knocking no longer takes place.

Figure 1:
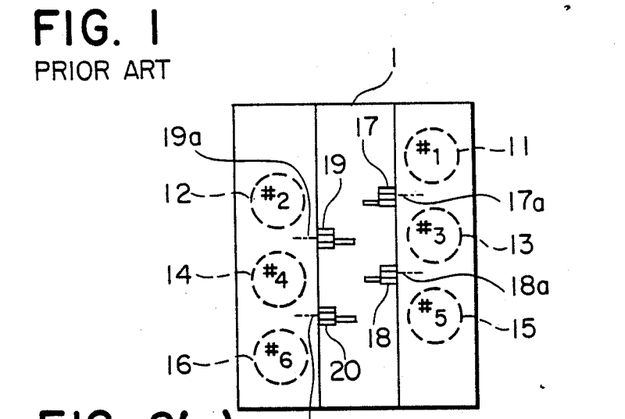
FIG. 1 is a plan view of the cylinder block of a V-6 engine equipped with a conventional knocking suppression apparatus.
Figure 2A:
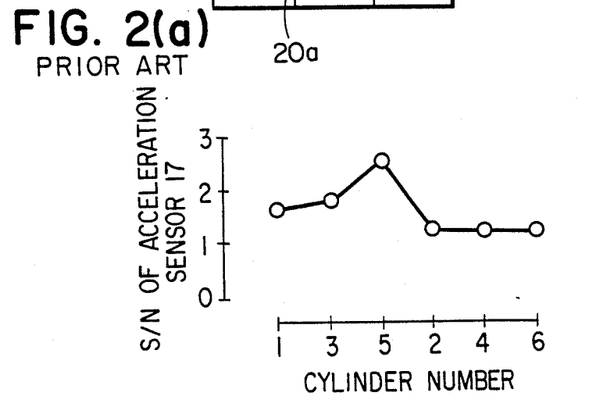
FIGS. 2(a)–2(d) are graphs of the signal-to-noise ratios with respect to each cylinder of the knock sensors of FIG. 1.
Figure 2B:
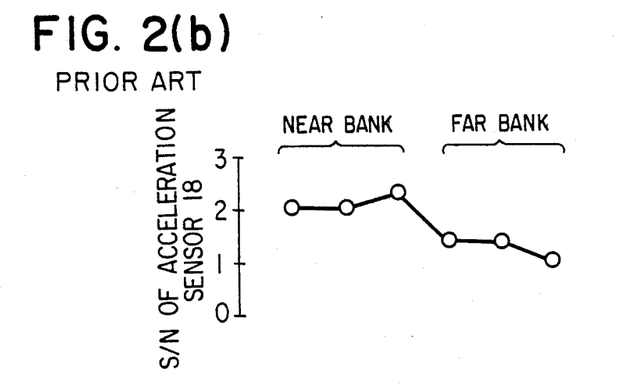
Figure 2C:
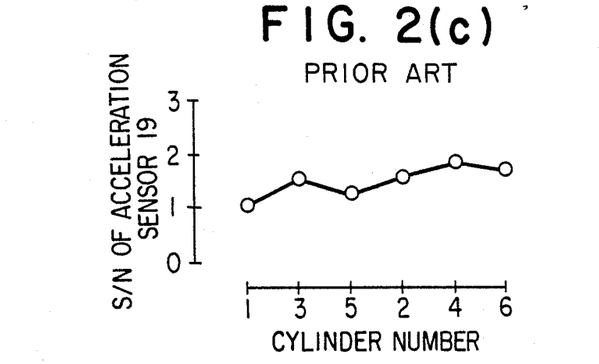
Figure 2D:
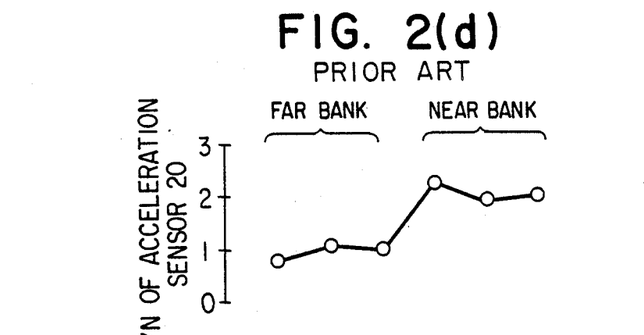

In a conventional knocking suppression apparatus, a plurality of knock sensors are mounted directly on the cylinder block of an engine. FIG. 1 is a plan view of the cylinder block 1 of a conventional V-6 engine which is equipped with a knocking suppression apparatus. Reference numerals 11–16 indicate cylinder #1 through cylinder #6, respectively, of the engine. First through fourth knock sensors 17–20 in the form of acceleration sensors are mounted directly on the cylinder block 1 at four mounting locations 17a–20a, respectively, on the inner surfaces of the cylinder block 1 adjoining the two banks of cylinders. Each mounting location 17a–20a lies roughly midway between two adjacent cylinders of the engine.

FIG. 2(a) through 2(d) show the signal-to-noise ratio (S/N) of each knock sensor with respect to each cylinder of the engine. The signal-to noise ratio is the ratio of the level of the output of a knock sensor when knocking is taking place in one of the cylinders to the level of the output when there is no knocking. A signal-to-noise ratio of above a certain level is necessary to accurately detect knocking, and the higher the ratio, the better. The "near bank" is the bank of cylinders on which the knock sensor is mounted, while the "far bank" is the opposite bank of cylinders. Each knock sensor has a good S/N with respect to knocking by cylinders in the near bank, but it has a poor S/N with respect to knocking by cylinders in the far bank. For example, the first knock sensor 17 is sensitive to knocking by cylinders #1, #3, and #5, but it has poor sensitivity to knocking by the other three cylinders.

Since each knock sensor requires an individual signal processing circuit to identify knock signals in its output, the cost of a conventional knocking suppression apparatus is high. The cost is further increased by the time required to install the four knock sensors on an engine. It is therefore highly desirable to be able to reduce the number of knock sensors which are employed.

Ideally, a knock suppression apparatus would employ only a single knock sensor. With this object, numerous tests were performed to determined the best mounting location of a knock sensor on a V-6 engine. However, even under the best circumstances, a single knock sensor had an adequately high S/N for only 5 of the 6 cylinders. Accordingly, if a knock sensor is directly mounted on a cylinder block of a V-6 engine in the conventional manner, it is necessary to employ at least two knock sensors in order to obtain a satisfactory S/N for all six cylinders.

The same problem is experienced with knocking suppression apparatuses for in-line six-cylinder engines, which also require a plurality of knock sensors.

SUMMARY OF THE INVENTION

Accordingly, it is an object of the present invention to provide a knocking suppression apparatus for an internal combustion engine which employs only a single knock sensor.

It is another object of the present invention to provide a knocking suppression apparatus which can be employed with either V-type or in-line engines.

A knocking suppression apparatus according to the present invention has a knock sensor which is mounted on a bracket. The bracket is secured to an engine in at least two locations. The bracket transmits engine vibrations to the knock sensor, and the knock sensor generates an output signal corresponding to the vibrations. A knocking suppression means identifies signals due to knocking in the output signal of the knock sensor. When knocking signals are identified, the knocking suppression means controls some aspect of engine operation so as to suppress the knocking.

Any of a number of conventional knocking suppression circuits can be employed as the knocking suppression means. In preferred embodiments, the knocking suppression means is a circuit which controls the current of an ignition coil so as to delay the ignition timing when knocking is sensed. However, the knocking suppression circuit can instead be one which controls the fuel supply to the engine, or one which controls the operation of a supercharger to adjust the intake manifold pressure when knocking occurs.

In preferred embodiments, the present invention is applied to a six-cylinder engine, but there is no restriction on the number of cylinders in the engine.

BRIEF DESCRIPTION OF THE DRAWINGS

FIG. 9(a–h) is a waveform diagram of the output signals of various portions of the circuit of FIG. 7 when there is no knocking.

FIG. 10(a–h) is a waveform diagram of the output signals of various portions of the circuit of FIG. 7 when knocking is taking place.

DESCRIPTION OF THE PREFERRED EMBODIMENTS

Figure 3:
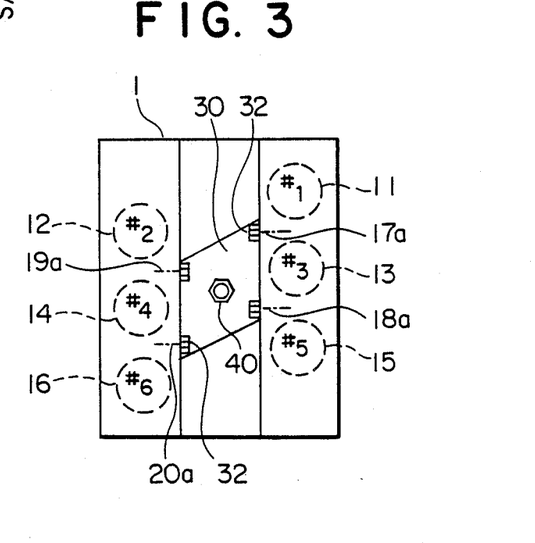
FIG. 3 is a plan view of the cylinder block of a V-6 engine equipped with a first embodiment of a knocking suppression apparatus according to the present invention.

A number of preferred embodiments of a knocking suppression apparatus according to the present invention will now be described while referring to the accompanying drawings. FIG. 3 is a plan view of the cylinder block 1 of a V-6 engine equipped with a knocking suppression apparatus according to a first embodiment of the present invention. The engine has six cylinders 11–16 which are divided into two banks. A plate-shaped support bracket 30 is secured to the inner surfaces of the cylinder block 1 by bolts 32 at four mounting locations 17a–20a, respectively, each of which is located roughly midway between two adjoining cylinders. The mounting locations 17a–20a are the same locations where knock sensors 17–20 are mounted in the conventional knocking suppression apparatus of FIG. 1. A knock sensor 40 in the form of an acceleration sensor is secured to roughly the center of the bracket 30. Engine accelerations are transmitted from the cylinder block 1 to the knock sensor 40 by the bracket 30. The knock sensor 40 generates an electrical output signal corresponding to the accelerations which it senses. Based on the output signal of the knock sensor 40, a knocking suppression circuit controls the ignition timing so as to suppress knocking.

The bracket 30 can be made of any material which can transmit vibrations well and has adequate strength and durability to withstand the severe conditions in the vicinity of an internal combustion engine. Typical engine materials such as cast iron and aluminum can be employed. However, aluminum has a low stiffness and does not transmit vibrations particularly well, so an aluminum bracket tends to attenuate engine vibrations before they can reach the knock sensor 40, particularly at high frequencies above 10 kHz. Cast iron is superior to aluminum from the standpoints of rigidity, workability, cost, and vibration transmission. In addition, because of its high strength, cast iron allows considerable flexibility of design. Examples of cast irons which can be used for the bracket include FC25 and FCD50. FCD50 is particularly suitable.

Figure 7:
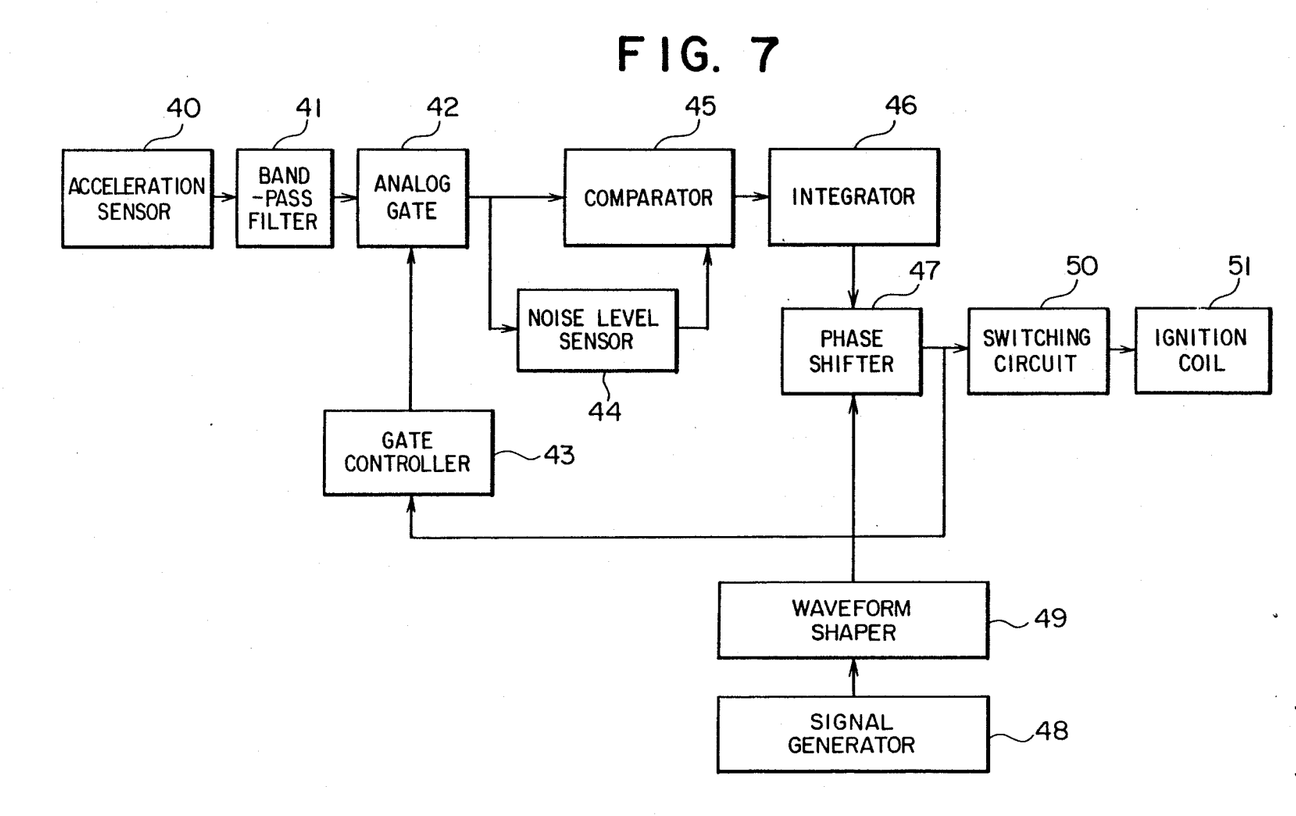
FIG. 7 is a block diagram of an example of a knocking suppression circuit which can be employed in the present invention.

FIG. 7 is a block diagram of an example of a knocking suppression circuit which can be employed in the present invention. As shown in this figure, the output signal of the knock sensor 40 is input to a band-pass filter 41. The band-pass filter 41 passes only that component of the output signal of the knock sensor 40 lying in a frequency band corresponding to engine knocking, and this component is input to an analog gate 42 which can be turned on and off in order to block noise which is an impediment to the detection of knocking signals. The opening and closing of the analog gate 42 is controlled by a gate controller 43. The output of the analog gate 42 is provided to a noise level sensor 44 which generates an output signal having a DC voltage which is proportional to the average amplitude of the rectified output of the analog gate 42.

The output of the analog gate 42 and the output of the noise level sensor 44 are input to a comparator 45, which generates output pulses when the input signal from the analog gate 42 is higher than the input signal from the noise level sensor 44. The output pulses from the comparator 45 are integrated by an integrator 46, which generates an output signal whose voltage corresponds to the strength of the knocking of the engine.

A signal generator 48 generates pulses at a frequency corresponding to the rotational speed of the engine. These pulses are shaped by a waveform shaper 49 and input to a phase shifter 47. The output signal of the integrator 46 is also provided to the phase shifter 47. The phase shifter 47 generates output pulses having a phase which is shifted from that of the output of the waveform shaper 49 by an amount corresponding to the magnitude of the output signal of the integrator 46. The output pulses of the phase shifter 47 operate a switching circuit 50 which controls the supply of current to an ignition coil 51.

Figure 8:
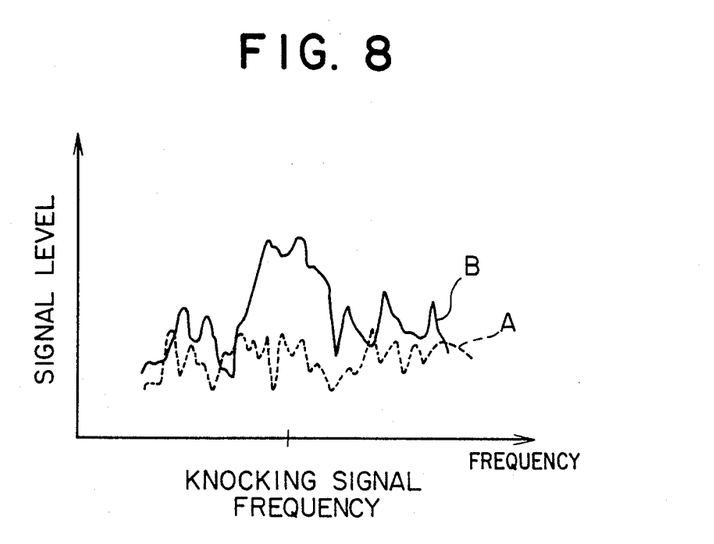
FIG. 8 is a graph of the frequency characteristics of the output signal of a knock sensor of a knocking suppression apparatus according to the present invention.

FIG. 8 illustrates the frequency characteristics of the output signal of the knock sensor 40. In the figure, curve A shows the characteristics of the output signal when there is no knocking, and curve B shows the characteristics of the output signal when knocking is occurring. In addition to a knocking signal (a signal which is generated by knocking), the output signal of the knock sensor 40 contains various other noise components such as components due to mechanical noise of the engine, ignition noise, and noise due to the signal transmission pathway.

Comparing curve A and curve B of FIG. 8, it can be seen that the knocking signal has unique frequency characteristics. Although the frequency distribution of the knocking signal will differ from engine to engine and in accordance with differences in the location in which the knock sensor 40 is mounted, there is always a clear difference in the characteristics of the output of the knock sensor 40 when knocking is taking place.

By passing only the frequency component corresponding to the knocking signal, noise at other frequencies is suppressed and the knocking signal can be efficiently detected.

Figure 9:
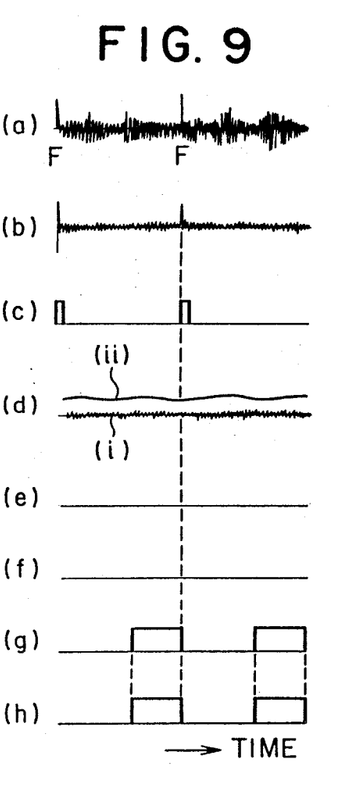
Figure 10:
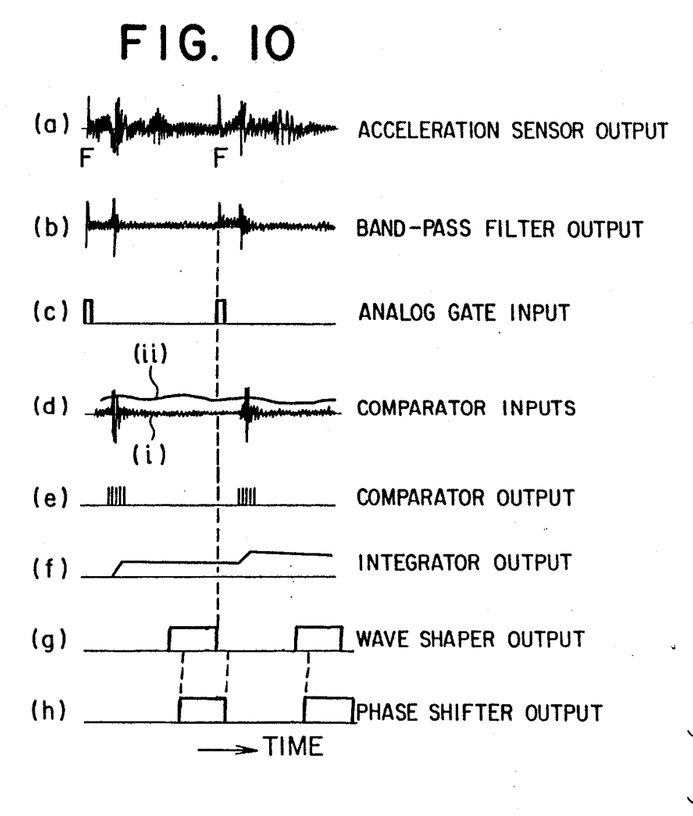

The operation of the knocking suppression circuit of FIG. 7 will be explained while referring to FIGS. 9 and 10, which illustrate the waveforms of the output signals of various portions of the circuit of FIG. 7. FIG. 9 illustrates the case when there is no knocking and FIG. 10 illustrates the case when knocking is taking place in the engine. When the engine is operating, the signal which is generated by the signal generator 48 in accordance with previously-determined ignition timing characteristics undergoes waveform shaping in the waveform shaping circuit 49 to form pulses which are input to the phase shifter 47. The pulses drive the switching circuit 50 via the phase shifter 47 and switch the current to the ignition coil 51 on and off. When the current to the ignition coil 51 is cut off, the ignition coil 51 generates a high voltage which is applied to unillustrated spark plugs of the engine.

The engine vibrations which occur during engine operation are detected by the knock sensor 40, which generates an output signal as shown by FIG. 9a. When the engine is not knocking, the output signal of the knock sensor 40 does not include a component due to knocking, but it includes components due to other mechanical vibrations or due to ignition noise which is superimposed on the signal transmission pathway at the time of firing F of the cylinders.

This signal is passed through the band-pass filter 41, and a large part of the mechanical noise component is suppressed, as shown in FIG. 9b. However, as the ignition noise component is strong, it has a high level even after passing through the band-pass filter 41, as shown by the spikes in FIG. 9b.

In order to prevent the ignition noise from being misidentified as knocking signals, the analog gate 42 is closed for a prescribed length of time each time one of the cylinders is fired. The analog gate 42 is closed by a pulse (FIG. 9c) which is output by the gate controller 43, which is triggered by the output of the phase shifter 47, and as a result, the ignition noise is removed. Therefore, only low-level mechanical noise remains in the output of the analog gate 42, as shown by curve (i) of FIG. 9d. This output signal is provided to the noise level sensor 44 and the comparator 45.

The noise level sensor 44 responds to changes in the peak level of the output signal of the analog gate 42. It can respond to a relatively gradual change in the peak value of normal mechanical noise, and it generates an output signal having a DC voltage which is slightly higher than the peak of the mechanical noise (curve (ii) in FIG. 9d). This output signal is also provided to the comparator 45.

The comparator 45 generates an output signal when the input signal from the analog gate 42 is higher than the input signal from the noise level sensor 44. As shown in FIG. 9d, when knocking is not taking place, the output of the noise level sensor 44 is higher than the average peak value of the output signal of the analog gate 42, so that as shown in FIG. 9e, nothing is output from the comparator 45.

The integrator 46 integrates the output signal from the comparator 45, and when knocking is not taking place, the output signal of the integrator 46 is zero as shown in FIG. 9f.

The phase shifter 47 shifts the phase of the input signal from the waveform shaper 49 (shown by FIG. 9g) in accordance with the voltage of the output signal of the integrator 46. When there is no knocking, the integrator 46 output voltage is zero, so the phase shifter 47 does not produce a phase shift, and the output signal of the phase shifter 47 (FIG. 9h) is in phase with the output signal of the waveform shaper 49. As a result, the engine is operated with a reference ignition timing.

However, when knocking takes place, the output of the knock sensor 40 contains a knocking signal which is delayed from the ignition timing by a certain amount, as shown in FIG. 10a. After this signal passes through the band-pass filter 41 and the analog gate 42, it consists of mechanical noise on which the knocking signal is superimposed, as shown by curve (i) in FIG. 10d.

Of the signals which pass through the analog gate 42, the knocking signal has a particularly steep slope, so the response of the output voltage of the noise level sensor 44 is delayed with respect to the knocking signal. As a result, the input to the comparator 45 from the noise level sensor 44 is as shown by curve (ii) in FIG. 10d, and the comparator 45 generates output pulses, as shown in FIG. 10e corresponding to the points at which the level of curve (i) is greater than the level of curve (ii).

The integrator 46 integrates the pulses from the comparator 45 and generates a voltage corresponding to the amount of knocking, as shown in FIG. 10f. Then, the phase shifter 47 generates an output signal (FIG. 10h) which is delayed with respect to the output signal of the waveform shaper 49 (FIG. 10h) by a prescribed amount corresponding to the output voltage of the integrator 46. Therefore, the ignition timing is retarded by the prescribed amount, and knocking is suppressed.

Knocking suppression circuits like the one illustrated in FIG. 7 are well-known to those skilled in the art, so a more detailed explanation of its operation will be omitted.

Figure 4:
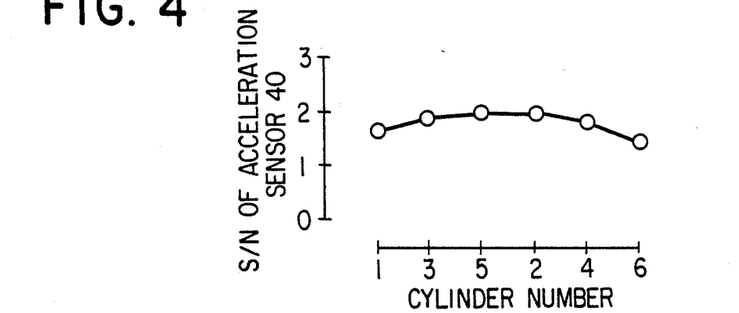
FIG. 4 is a graph of the signal-to-noise ratio with respect to each cylinder of the knock sensor of FIG. 3.

FIG. 4 shows the signal-to-noise ratio of the output signal of the knock sensor 40 with respect to each cylinder. Since the vibrations which are applied to the bracket 30 at the four mounting locations 17a-20a are combined, the signal-to-noise ratio with respect to individual cylinders is not superior to the signal-to-noise ratio for the knock sensors 17-20 of the conventional arrangement of FIG. 1. However, there is little variation among the cylinders in the signal-to-noise ratio, and an adequate signal-to-noise ratio can be obtained for all six cylinders. Therefore, the present invention makes it possible to accurately sense knocking using only a single knock sensor. This results in a great decrease in cost, since the number of knock sensors and the number of circuits needed to process the output signals of the sensors can both be decreased.

Figure 5A:
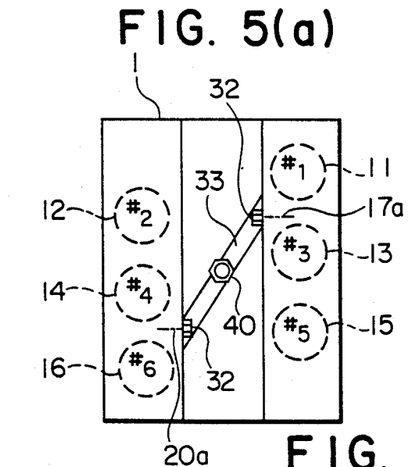
FIGS. 5(a)–5(c) are plan views of the cylinder blocks of V-6 engines equipped with other embodiments of a knocking suppression apparatus according to the present invention.
Figure 5B:
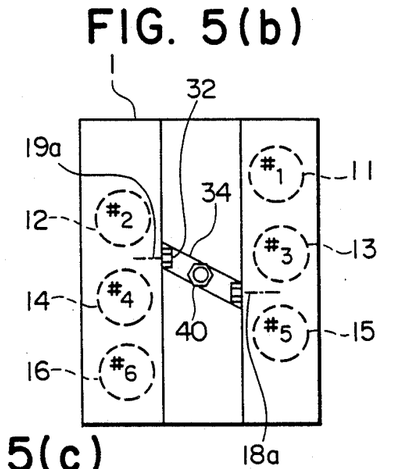

FIGS. 5a and 5b illustrate two other embodiments of the present invention. In these embodiments, a knock sensor 40 is mounted on a bracket which is secured to an cylinder block 1 at only two locations instead of four. In the embodiment of FIG. 5a, a bracket 33 is secured to a cylinder block 1 at mounting locations 17a and 20a, while in the embodiment of FIG. 5b, a bracket 34 is secured to the cylinder block 1 at mounting locations 18a and 19a. The choice of the mounting locations depends on which locations have the best sensitivity to engine vibrations. In some cases, vibrations can be sensed more easily at locations 17a and 20a than at 18a and 19a or vice versa. The most suitable mounting locations can be easily determined by experiment. If mounting locations 17a and 20a have the same sensitivity as locations 18a and 19a, then the arrangement of either FIG. 5a or 5b can be employed. These arrangements have the advantage that the brackets 33 and 34 are smaller and lighter than the bracket 30 of FIG. 3 and can be installed more easily, since they require only two mounting locations. The knocking suppression circuit of FIG. 7 can be employed with these embodiments. The operation of these embodiments is the same as that of the embodiment of FIG. 3.

Figure 5C:
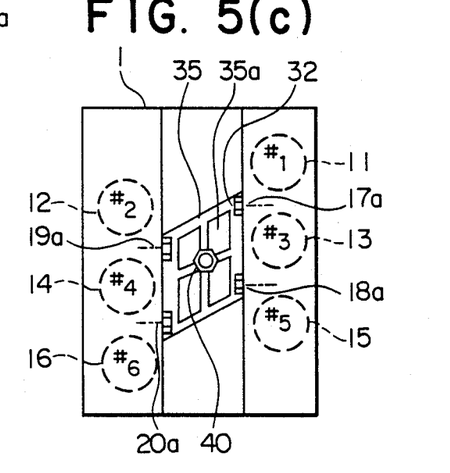

FIG. 5c illustrates another embodiment of the present invention in which a knock sensor 40 is secured to a frame-like bracket 35 having a plurality of openings 35a formed in it. The bracket 35 is secured to the cylinder block 1 at the four mounting locations 17a-20a by bolts 32. This type of bracket 35 has the advantage that it is lighter than the plate-shaped bracket 30 of FIG. 3. Due to excessive resonance and other factors, the transmission characteristics of this type of bracket 35 may be reduced at certain frequencies, resulting in the strength of the vibrations at the knock sensor 40 being much less than their strength at the mounting locations 17a-20a. Therefore, it is necessary to exercise care in the design of the bracket 35 in order to prevent undesired attenuation of knocking signals. However, since it can attenuate the strength of vibrations at certain frequencies, this type of bracket 35 can function as a sort of filter and thereby increase the sensitivity of the knock sensor 40.

The brackets 33 and 34 of FIGS. 5a and 5b can also be in the form of frames so as to function as filters.

Figure 6:
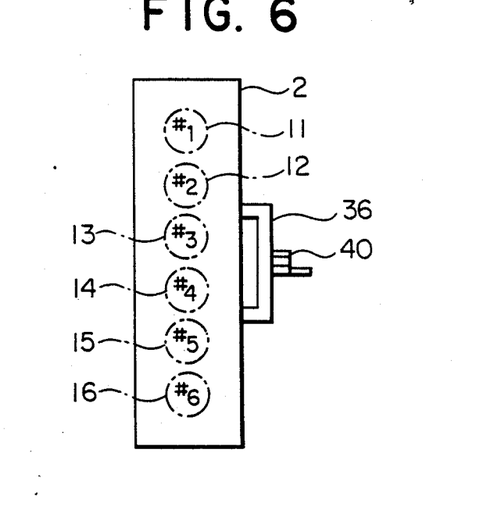
FIG. 6 is a plan view of the cylinder block of an in-line six-cylinder engine equipped with a knocking suppression apparatus according to the present invention.

The preceding embodiments of the present invention were all applied to a V-type engine, but the present invention can also be applied to an in-line engine. FIG. 6 is a plan view of the cylinder block 2 of an in-line six-cylinder engine which is equipped with another embodiment of the present invention. In this embodiment, a C-shaped bracket 36 is secured to one side of the cylinder block 2 between cylinders #2 and #3 and between cylinders #4 and #5 by unillustrated bolts. A knock sensor 40 is mounted on the bracket 36. The knock sensor 40 is connected to an unillustrated knocking suppression circuit of the type illustrated in FIG. 7. The structure and operation of this embodiment are otherwise the same as that of the previous embodiments, and the same effects are obtained.

What is claimed is:

1. A knocking suppression apparatus for a multi-cylinder internal combustion engine comprising:
   a bracket mounted on the engine at at least two mounting locations;
   a knock sensor mounted on the bracket; and
   knocking suppression means responsive to the knock sensor for controlling the engine operation to suppress knocking,
   wherein the engine is a V-type engine having a cylinder block defining two banks of cylinders, at least one of the mounting locations is located on each bank, and the bracket is mounted on the engine at only two mounting locations, each of which is located between a pair of adjacent cylinders.

2. A knocking suppression apparatus as claimed in claim 1, wherein the bracket is disposed between the two banks of cylinders and each mounting location is located on a surface of the cylinder block between the two banks.

3. A knocking suppression apparatus as claimed in claim 1, wherein the knocking suppression means comprises means for delaying the ignition timing of the engine to suppress knocking.

4. A knocking suppression apparatus for a multi-cylinder internal combustion engine comprising:
   a bracket mounted on the engine at at least two mounting locations;
   a knock sensor mounted on the bracket; and
   knocking suppression means responsive to the knock sensor for controlling the engine operation to suppress knocking, wherein the engine is a in-line engine, and the bracket is a C-shaped bracket connected to the engine at two mounting locations, each of which is located between two adjacent cylinders.

5. A knocking suppression apparatus for a multi-cylinder internal combustion engine comprising:
   a bracket mounted on the engine at at least two mounting locations, and exclusively serving as a mount for a knock sensor;
   a knock sensor mounted on the bracket; and
   knocking suppression means responsive to the knock sensor for controlling the engine operation to suppress knocking, wherein the engine is a V-type engine having a cylinder block defining two banks of cylinders, at least one of the mounting locations is located on each bank, the bracket extends diagonally across the cylinder block between the two banks, and the knock sensor is centrally mounted on the bracket.

6. A knocking suppression apparatus as claimed in claim 5, wherein each mounting location is located on the cylinder block between two adjacent cylinders of the engine.

7. A knocking suppression apparatus as claimed in claim 5, wherein the bracket is plate-shaped.

8. A knocking suppression apparatus as claimed in claim 1, wherein the bracket is a frame having openings formed therein.

9. A knocking suppression apparatus as claimed in claim 5, wherein each mounting location is located between a pair of adjacent cylinders.

10. A knocking suppression apparatus as claimed in claim 5, wherein the bracket is mounted on the engine at only two mounting locations, each of which is located between a pair of adjacent cylinders.

11. A knocking suppression apparatus as claimed in claim 5, wherein the bracket is configured as an elongate bar member.

* * * * *